March 19, 1935.  J. HAUK  1,994,704
FASTENER FOR BALE TIES AND THE LIKE
Filed March 6, 1934  2 Sheets-Sheet 1

Inventor:
JOSEPH HAUK,
by Usina + Rauber
his Attorneys.

March 19, 1935.  J. HAUK  1,994,704
FASTENER FOR BALE TIES AND THE LIKE
Filed March 6, 1934  2 Sheets-Sheet 2
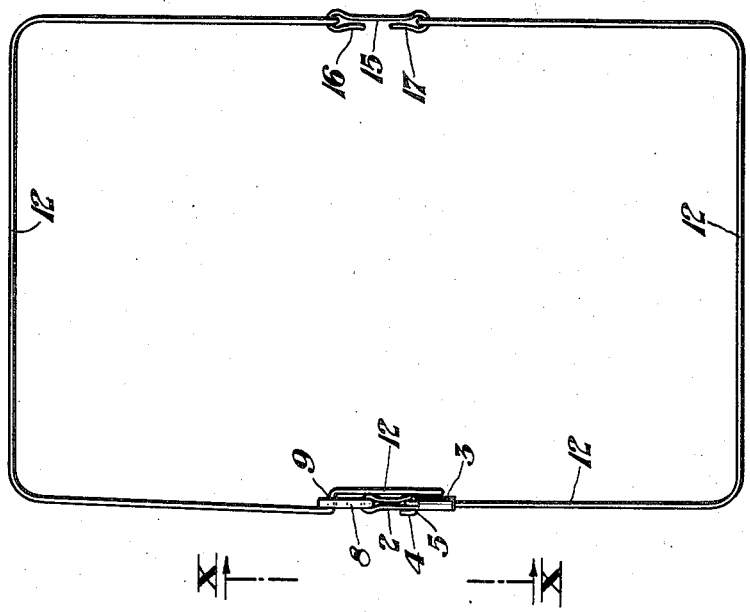
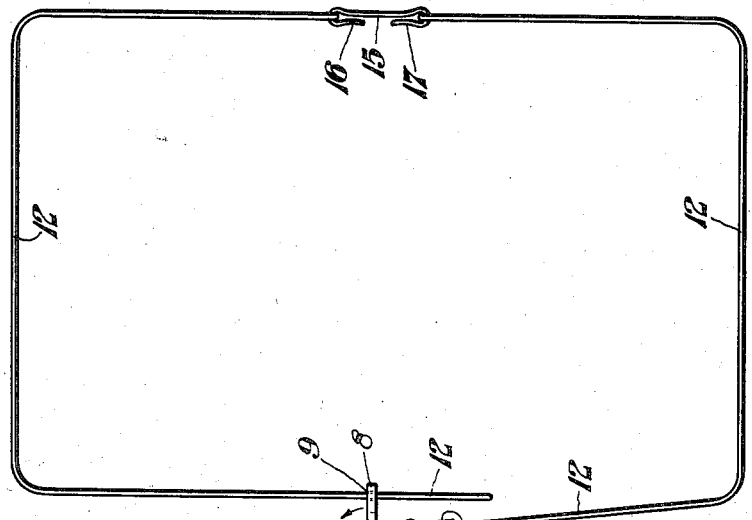
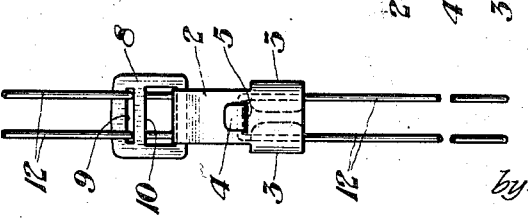
Inventor:
JOSEPH HAUK,
by his Attorneys.

Patented Mar. 19, 1935

1,994,704

UNITED STATES PATENT OFFICE 1,994,704

FASTENER FOR BALE TIES AND THE LIKE

Joseph Hauk, Muskego, Wis., assignor to The American Steel and Wire Company of New Jersey, a corporation of New Jersey Application March 6, 1934, Serial No. 714,311

5 Claims. (Cl. 24—28)

This invention relates to a novel fastener for bale ties and the like, and particularly as used in connection with the packaging of cotton, although not limited thereto.

In accordance with the general practice of handling cotton, it is customary to bale it, as it comes from the gin, into large bales having considerable weight, and to subsequently compress the gin bale to about one-fourth of its original size so that it will occupy a minimum amount of space during transportation. It is frequently the custom to economize in bale-tying material by using the original gin bale ties again on the compress bales.

In view of the fact that the cotton is subjected to a very great pressure in reducing the gin bales to compress bale size, it is necessary that the bale ties be very strong. It is also quite important that, when the ties are positioned on the bales, no projecting ends or sharp corners occur which might result in injury to persons handling the bales or, which, by rubbing together, might cause sparks which could ignite the cotton.

One object of the present invention is the provision of a novel fastener for bale ties and the like, which is unusually strong and durable and at the same time light in weight.

Another object is to provide a novel device of the class described which may be very rapidly applied to cotton bales and the like and present no possibility of slippage due to the compression of the cotton.

These and further objects will be apparent after referring to the drawings, in which.

Figure 1:
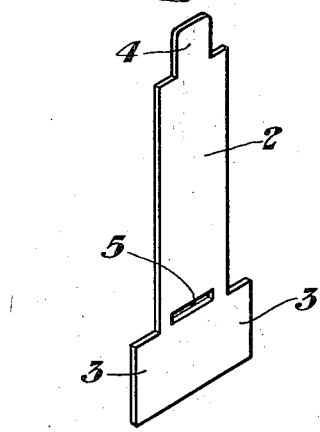
Figure 1 is a perspective of the blank of the clasp of the invention.
Figure 2:
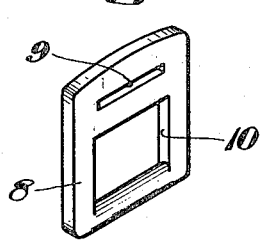
Figure 2 is a perspective of the buckle of the invention.
Figure 3:
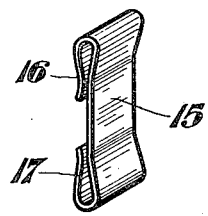
Figure 3 is a perspective of a clip for uniting a pair of bale tying elements.
Figure 4:
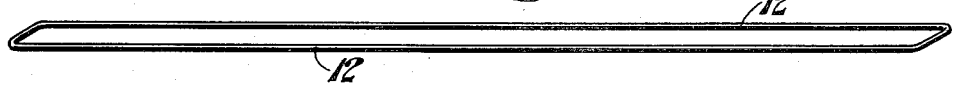
Figure 4 is a perspective of a tying element composed of an elongated wire loop.
Figure 5:
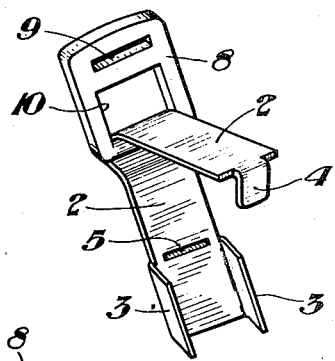
Figure 5 is a perspective of the clasp of Figure 1 as used in conjunction with the buckle of Figure 2.
Figure 6:
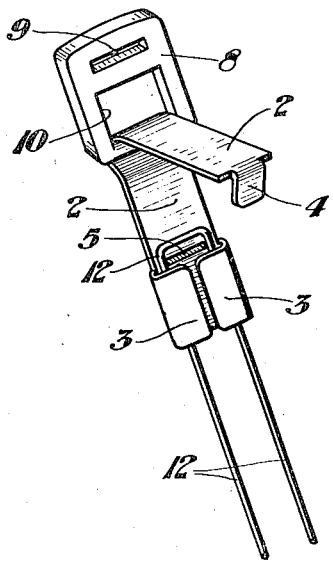
Figure 6 is a view similar to Figure 5 but showing the manner in which one end of a tying element is held in the clasp.
Figure 7:
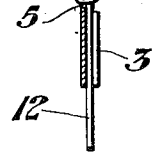
Figure 7 is a sectional elevation.

Figures 8 and 9 disclose the manner of applying the device of the invention to a bale.

Figure 10 is a view on the line X—X of Figure 9.

Referring more particularly to the drawings, the numeral 2 designates a substantially rectangular metallic blank having a wing 3 extending from each of its sides adjacent one of its ends. The rectangular blank 2 is provided on its other end with a tongue 4, and has a slotted aperture 5 adjacent the wings 3.

The novel buckle of the invention comprises a substantially square metallic blank 8 having, adjacent one of its ends, a relatively narrow slotted aperture 9, and an aperture 10 of greater size adjacent its other end.

The tying elements for the cotton bales comprise a plurality of wire loops 12, which describe parallelogram formations. The ends of the wires of the loops 12 are preferably connected together by welding.

In accordance with the teaching of the invention, one end of one of the wire loops 12 is disposed on the blank 2 between and slightly beyond the wings 3 which are bent in such manner as to extend inwardly and each made to hold one side thereof. In this position, the slot 5 is exposed between the sides of the wire loop. The end of the wire loop 12 which is opposite that held by the inwardly extending wings 3 of the blank 2 is connected to one end of a similar wire loop 12 by means of a clip 15 having reverse tongues 16 and 17 on its ends. The other end of the second wire loop 12 is extended through the large aperture 10 in the buckle 8.

The blank 2 is disposed on the outer surface of a cotton bale in such manner that its inwardly extended wings 3 are on its upper surface. The buckle 8 is so disposed that the other end of the second wire loop 12 extends across a portion of its upper surface, through the aperture 9 and along its under side. The second wire loop 12 is drawn through the aperture 9 until both loops are sufficiently taut. The portion of the blank 2 which extends from the wings 3, together with the tongue 4 on its extremity, is passed upwardly through the aperture 10 in the buckle 8, and bent backwardly in such manner as to permit the tongue 4 to extend through the slotted aperture 5. This aperture, as before stated, is between the wires of the end of the first wire loop 12 which is held by the inwardly bent wings 3. The tongue 4 is then bent in such manner as to extend toward the buckle 8. In this way the tongue 4 will not tend to withdraw from the slotted aperture 5 of the blank 2, and it will serve additionally to engage the extremity of the first wire loop 12 if the inwardly bent wings 3 fail to hold it. The bale ties are thus positively kept from separating, under any circumstances.

It is also to be noted that no sharp protuberances or edges are provided by either the clasp 2 or its buckle 8, and the advantages previously described will be attained.

While I have shown and described one specific embodiment of my invention it will be understood that I do not wish to be limited exactly thereto, since various modifications may be made without departing from the scope of my invention, as defined in the following claims.

I claim:

1. A fastener for bale ties and the like, comprising a buckle having an aperture for receiving one of the ends of said tie, and a foldable clasp for the other end of said tie, said buckle having another aperture for receiving said foldable clasp.

2. A fastener for bale ties and the like, comprising a buckle having an aperture for receiving one of the ends of said tie, a foldable clasp for the other end of said tie, and a tongue on said clasp, said buckle having another aperture for receiving said clasp, said clasp having an aperture to receive said tongue.

3. A fastener for bale ties and the like, comprising a buckle having an aperture for receiving one of the ends of said tie, a foldable clasp having inwardly bent wings for holding the other end of said tie, and a tongue on the outer end of said foldable clasp, said buckle having another aperture for receiving said clasp, said foldable clasp having an aperture to receive said tongue.

4. A fastener for bale ties and the like, comprising a buckle having an aperture for receiving one of the ends of said tie, a foldable clasp having inwardly bent wings for holding the other end of said tie, said buckle having another aperture for receiving said clasp, and a tongue on the outer end of said foldable clasp, said clasp having an aperture for receiving said tongue.

5. A fastener for looped bale ties and the like, comprising a buckle having an aperture for receiving one of the ends of said tie, a foldable clasp having inwardly bent wings for holding both of the sides of the other end of said tie, said buckle having another aperture for receiving said foldable clasp, and a tongue on the outer end of said foldable clasp, said clasp having an aperture for receiving said tongue between the sides of the ends of said looped bale tie which are held by said inwardly bent wings.

JOSEPH HAUK.